UNITED STATES PATENT OFFICE.

EMIL KNOEVENAGEL, OF HEIDELBERG, GERMANY.

ART OF DYEING ACETYL CELLULOSE.

1,002,408.  Specification of Letters Patent.  Patented Sept. 5, 1911.

No Drawing.  Application filed November 23, 1907. Serial No. 403,574.

*To all whom it may concern:*

Be it known that I, EMIL KNOEVENAGEL, professor of chemistry, a subject of the German Emperor, residing at Heidelberg, in the Grand Duchy of Baden, Germany, have invented certain new and useful Improvements Relating to the Art of Dyeing Acetyl Cellulose, of which the following is a specification.

Acetyl-cellulose, being more or less water repellent, cannot be dyed at all or only very feebly by the ordinary processes of dyeing in aqueous solution. I have discovered, however, that acetyl-cellulose and products such as filaments made from the same are capable of absorbing a great variety of amins and derivatives of these compounds, and that acetyl-cellulose abstracts these substances even from dilute aqueous solutions. In this manner it is possible, to produce in products of acetyl-cellulose, in the presence of water, solutions of amins, even of those, which are not soluble or only sparingly soluble in water, and utilize these solid solutions for the production of coloring matter on the fiber or filament in the known manner. For instance, the solid solutions of amins in acetyl-cellulose may be utilized for producing coloring matters on the fiber by coupling with aqueous solutions of diazonium salts. The solid solutions in acetyl-cellulose of compounds containing primary amin groups may be used by transforming the amins in the acetyl-cellulose into diazonium compounds in the known manner, which compounds may then be coupled with phenols amins and their derivatives, so as to form azo dyes on the fiber. From anilin, which has been dissolved in actyl-cellulose in this manner, anilin-black may be produced on the fiber by the known methods of producing this dye, by oxidation in the presence or absence of the usual catalytic substances.

In the process of dissolving amins in acetyl-cellulose I may transform or decompose salts of the bases by means of the equivalent quantity of bases or acids, or I may promote the liberation of the bases by the presence of suitable bases or acids in such a manner, that the said bases are simultaneously absorbed by the acetyl-cellulose. In some cases the absorption of the amins by acetyl-cellulose takes place directly from the solutions of their salts, but as a rule the absorption is facilitated by previously liberating the amin from its salts, as mentioned above. Salts of coloring matters are frequently absorbed by the acetyl-cellulose more easily in the presence of ammonia, in case we are dealing with salts of bases, and in the presence of acetic acid etc., if salts of acids are dealt with, than would be the case with the salts alone.

The following examples will serve to explain the process:

*1. Impregnation with anilin.*—Filaments for example from acetyl-cellulose are impregnated at ordinary temperature for about three hours in a 2% aqueous solution of anilin, rinsed with water and diazotized for about three minutes in 2% nitrite with 4 to 5 per cent. of sulfuric acid.

1ª. Filaments treated according to 1 gave with anilin on the fiber anilin yellow in the usual way.

1ᵇ. Filaments treated according to 1 gave with 1 to 2% beta-naphthol sodium solution, Soudan 1 on the fiber.

1ᶜ. Filaments treated according to 1 were brought together with a solution of 1.4 parts of potassium bichromate and 1.4 parts of concentrated hydrochloric acid in 40 parts of water, the solution being in quantity sufficient for covering, left therein for about a quarter of an hour at ordinary temperature and then heated to 80° C. for about a minute. Anilin black was formed on the fiber.

*2. Impregnation with p-nitranilin.*—Filaments of acetyl-cellulose were brought at the temperature of a water bath for half an hour into a 0.4% aqueous solution of p-nitranilin in water, briefly rinsed and diazotized as in 1.

2ª. Filaments treated according to 2 were coupled in the well-known way with beta-naphthol sodium solution on the fiber. Nitranilin red was formed on the fiber.

*3. Impregnation with aminoazobenzene.*—Filaments of acetyl-cellulose were impregnated for about 10 minutes with a warm solution of 0.44 of aminoazobenzene in water, briefly rinsed and Soudan III was produced in them similarly to 1 and 1ᵇ.

*4. Impregnation with beta-naphthylamin.*—Filaments of acetyl-cellulose were impregnated with a nearly hot saturated solution of beta-naphthylamin in water for a short time, (20 minutes for example) and azo Turkey red was produced in them by diazotization and coupling with beta-naphthol.

5. *Impregnation with alpha - naphthylamin.*—Acetyl-cellulose was impregnated in a nearly hot saturated solution of alpha-naphthylamin in water for about 20 minutes and alpha-naphthylamin Bordeaux was produced in it by diazotization and coupling with beta-naphthol.

6. *Impregnation with benzidin or dianisidin.*—Acetyl-cellulose was impregnated for about six hours at ordinary temperature with solution containing about 0.5% of the base. The impregnation may also be accomplished with suitably concentrated solutions of salts of the bases with the addition of the equivalent quantity of soda solution. The impregnated acetyl-celluloses were diazotized and coupled with beta-naphthol. A dark reddish brown or a reddish violet dyestuff was produced in the acetyl-cellulose.

7. *Impregnation with meta - phenylenediamin.*—Acetyl-cellulose was impregnated for about a quarter of an hour in a soda aqueous solution of m-phenylene-diamin containing about 1% (prepared if necessary from the salt by the addition of the equivalent quantity of soda solution) briefly rinsed, and afterward Bismark brown was developed in a 1% acidified nitrate solution.

8. *Impregnation with p-aminophenol.*—Acetyl-cellulose was impregnated with about a 0.5% aqueous solution of p-aminophenol at water bath temperature for about 10 minutes. By diazotizing and coupling with faintly alkaline pyrogallol solution, azochromin was produced.

9. *Impregnation with naphthionic acid.*—Acetyl silk was impregnated in about a 3% solution of sodium naphthionate in water for about 3 hours on a water bath. The absorption of the amino-sulfonic acid by the acetyl-cellulose is facilitated by the addition of acetic acid and sodium acetate. By diazotizing and coupling with beta-naphthol sulfonic acids real red E is produced.

What I claim is:

1. The improvement in the art of dyeing acetyl-cellulose, which consists in treating the acetyl-cellulose with an aqueous solution of an aromatic compound containing an amido group, then rinsing it with water and then dyeing it in the dye-bath, substantially as described.

2. The improvement in the art of dyeing acetyl-cellulose, which consists in treating the acetyl-cellulose with an aromatic amin in aqueous solution, then rinsing it with water and then dyeing it in the dye-bath, substantially as described.

In testimony whereof I have set my hand in the presence of two subscribing witnesses.

EMIL KNOEVENAGEL.

Witnesses:
HANS LEBACH,
JOS. H. LEUTE.